United States Patent [19]
Anderson

[11] 3,782,687
[45] Jan. 1, 1974

[54] MILKING MACHINE VALVE

[76] Inventor: Erling Anderson, R. R. 1, Matsqui, British Columbia, Canada

[22] Filed: Sept. 13, 1971

[21] Appl. No.: 179,636

[52] U.S. Cl. ............................................. 251/347
[51] Int. Cl. ............................................. F16k 31/44
[58] Field of Search .................. 251/341, 347, 353, 251/350, 149.1

[56] References Cited
UNITED STATES PATENTS

| | | | |
|---|---|---|---|
| 2,725,245 | 11/1955 | Hein | 351/149.1 X |
| 2,881,010 | 4/1959 | Bouma | 251/149.1 X |
| 3,288,429 | 11/1966 | Termini | 251/149.1 |
| 3,132,669 | 5/1964 | Feldsted | 251/347 X |
| 1,231,733 | 7/1917 | Haley et al. | 251/347 X |
| 2,657,709 | 11/1953 | Gillerstrom et al. | 251/341 X |
| 1,080,273 | 12/1913 | Fountain | 251/353 |
| 2,433,405 | 12/1947 | Stamm | 251/341 X |
| 2,545,588 | 3/1951 | Pulse | 251/341 X |
| 2,562,631 | 7/1951 | Morrison | 251/341 X |
| 2,841,314 | 7/1958 | Munson et al. | 251/353 X |
| 2,987,294 | 6/1961 | Merritt et al. | 251/347 X |
| 3,552,420 | 1/1971 | Robertson | 251/347 X |

*Primary Examiner*—Samuel Scott
*Attorney*—Owen J. Jones

[57] ABSTRACT

A valve for connecting a teat cup hose of a milking machine to a milk pipe line under vacuum, the valve having a base member connectable to the milk pipe line and a slider member having a projecting nipple and mounted for sliding movement on the base member, the members having milk passages which are moved into register when the teat cup hose is pushed on the nipple and moved out of register when the hose is pulled off the nipple.

3 Claims, 4 Drawing Figures

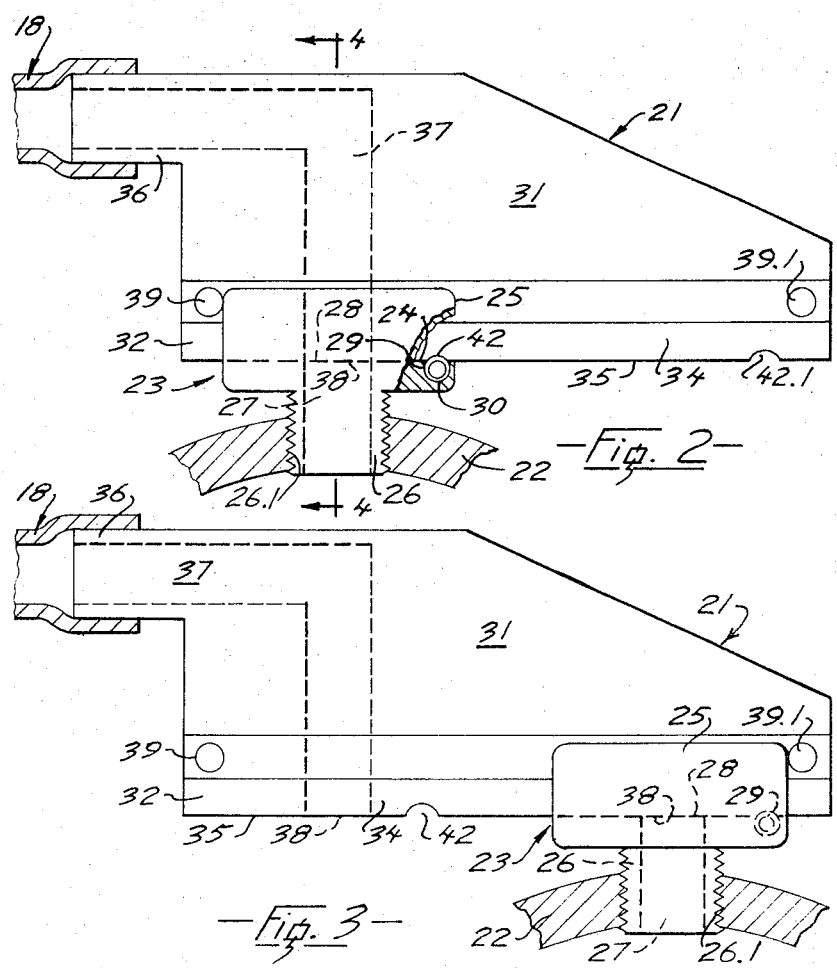
Fig. 2
Fig. 3
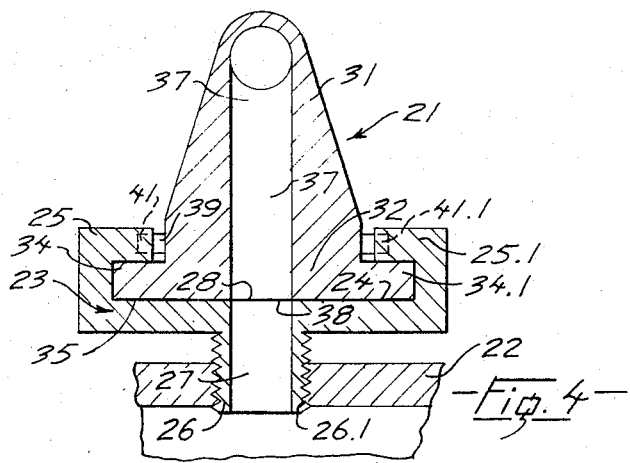
Fig. 4

MILKING MACHINE VALVE

BACKGROUND OF THE INVENTION

1. Field of the Invention

This invention relates to milking machines and in particular to a valve for connecting a milk pipe line under vacuum to teat cups of the machine.

2. Prior Art

In most milking machines teat cups, which are applied to teats of a cow's udder, are connected through a flexible hose to milk pipe line connected to a tank to which a vacuum is applied so as to draw the milk from the cow's udder into the pipe line and then to the tank.

In order to reduce contamination of milk, operational characteristics of a milking machine should be such that a vacuum can be maintained in the tank at all times when milking a number of cows in succession, and also enable a hose connection to a milking unit to be disconnected to release vacuum on the teats immediately a milking operation is completed.

In most milking machines the hoses are connected to the milk pipe line through valves which can be operated to carry out procedures as above described. Prior art valves, however, require a number of operations in order for properly carrying out a milking operation. Consequently, unless valve operational procedures are carried out correctly, contamination of milking machine components and milk can result.

SUMMARY OF THE INVENTION

The present invention provides a milking machine valve which is simple to operate, which automatically applies suction to teat cups when a teat cup hose is connected to the valve, and which automatically cuts off suction to the teat cups when the teat cup hose is disconnected. The valve of the present invention, consequently, minimizes milk contamination.

The valve of the present invention, furthermore, is relatively inexpensive to manufacture and is easy to opeate and clean.

The valve of the present invention includes a base member connectable to a milk pipe line of a milking machine, and a slider member having a nipple mounted for sliding movement on the base members.

Milk passages through both members are automatically moved into register when a teat hose is forced on to the nipple, and out of register when the hose is pulled off the nipple, so that the milking operation can be started by shoving the hose onto the nipple and stopped by pulling the hose out of the nipple.

A detailed description following, related to drawings, gives exemplification of apparatus according to the invention, which however is capable of expression in means other than those particularly described and illustrated.

DESCRIPTION OF THE DRAWINGS

FIG. 2 is a part sectioned elevation of a valve in an open position, portions of the valve being removed for clarity of illustration, FIG. 3 is a view, similar to FIG. 2, of the valve in a closed position, FIG. 4 is a section on 4—4 of FIG. 2.

DETAILED DESCRIPTION

FIG. 1

Figure 1:
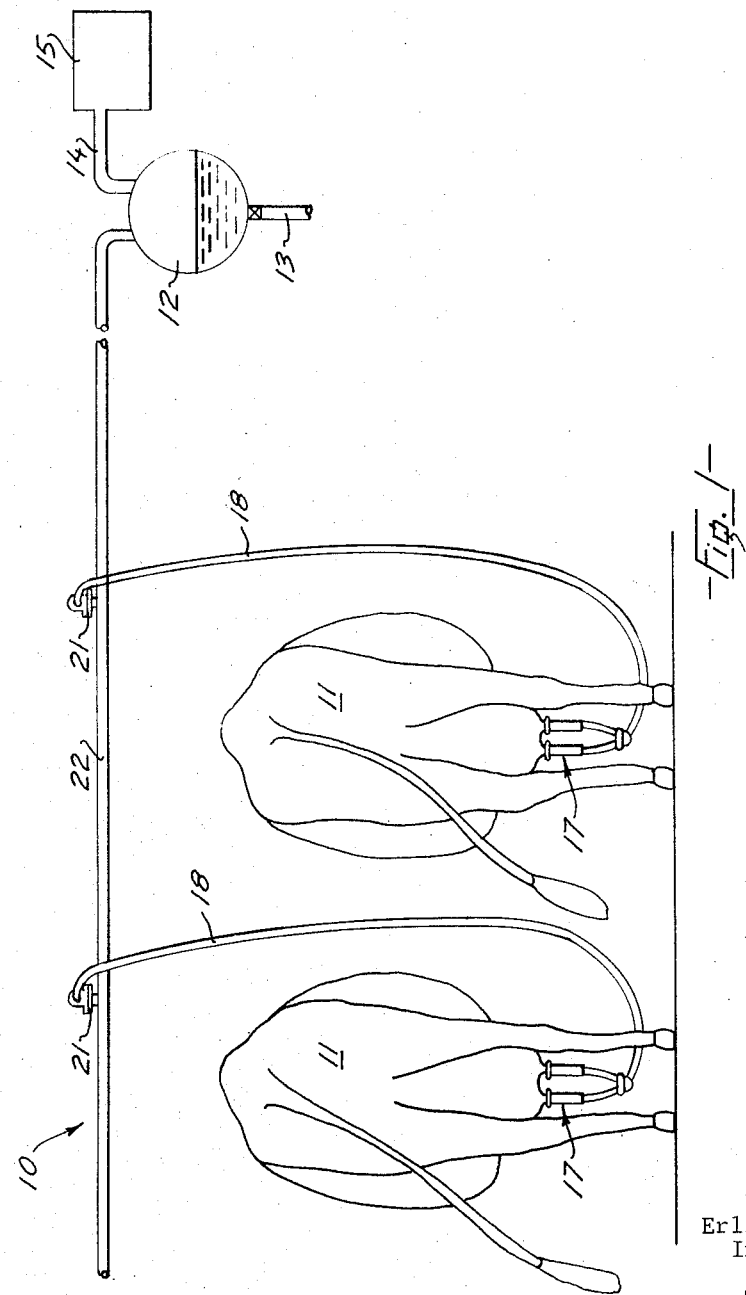
FIG. 1 shows a milking machine incorporating valves of the invention.

FIG. 1 shows diagrammatically a conventional milking machine, generally 10, used in milking cows 11. The milking machine has a milk tank 12 having a valve opeated discharge pipe 13, the tank being connected by a pipe 14 to a conventional vacuum pump 15. Teat cup groups 17 are connected through flexible hoses severally 18, and valves severally 21, to a milk pipe line 22 which has a connection with the tank 12.

When a valve is opened, suction is applied to the cow's teats so that milk is drawn from the teat and passes through the milk hose and the milk pipe line into the tank.

FIGS. 2, 3, AND 4

Each valve 21 has a base member 23 having a flat upper sealing face 24 over which a pair of inwardly turned parallel flanges 25 and 25.1 extend. The base member has a nipple 26 which is threaded into a tapped hole 26.1 in the milk pipe line 22. A milk passage 27 extends through the base member opening and through the nipple, and has an intake port 28 opening out of the sealing face 24. The base member has a resilient detent 29 which normally projects outwards of the sealing face 24. The detent is a length of resilient tubing which fits in a transverse groove 30 formed in the sealing surface. The tubing can be neoprene or hard rubber.

The valve also includes a slider member 31 having a rectangular flat base piece 32 which has a pair of outwardly extending flanges 34 and 34.1 having a sliding fit between the flanges 25 and 25.1 of the base member 23. The base piece 32 also has a flat sealing face 35 which has a sliding sealed engagement with the sealing surface 24 of the base member 23.

The slider member has a forwardly projecting nipple 36, and a milk passage 37 which opens at one end through a port 38 in the sealing face 35 and extends through the nipple 36.

Pins 39 and 39.1 extend transversely through the base member adjacent opposite ends thereof, each pin having projecting portions, FIG. 4 only, 41 and 41.1 which serve as stops to limit movement of the slider member. The pins are located so that with the base member against the pin 39, see FIG. 2, the ports 28 and 38 are in register, the valve then being open, and with the base member against the pin 39.1 the sealing faces 24 and 35 extend across and close the ports 38 and 28, the valve then being closed, see FIG. 3.

Transverse grooves 42 and 42.1 in the sealing face 35 receive the detent when the valve is in open and closed positions to restrain movement of the slide member from either position.

At least one of the pins 39 and 39.1 is removable so that the valve can be disassembled for cleaning.

OPERATION

The valve 21 is normally closed, see FIG. 3, so as to prevent air entering the milk pipe line. When a cow is to be milked, the teat cups are fitted to the cow's teats and the milk hose 18 is thrust over the nipple 36. At the same time the slider member is moved relative to the base member to the valve open position, FIG. 2, thus applying suction to the teats, the milk then flows through the milk hose, into the milk pipe line, and thence to the tank 12. When it is desired to discontinue a milking operation tension is applied to the milk hose so as to move the slider member to a valve closed position and the milk hose is pulled off the nipple 36.

It is seen that as the valve is automatically operated between open and closed positions when the milk hose is thrust on and pulled off the nipple of the slider member, introduction of air into the milk pipe line is effectively prevented.

Further, connection and disconnection of the milk hose to the milk line and operation of the valve between open and closed position is, essentially, a simple one handed operation.

I claim:

1. A valve for connecting a teat cup milk hose to a milk pipe line, the valve including:
   a a base member adapted to be connected to the milk pipe line, the base member having a flat sealing face,
   b a slider member mounted on the base member for sliding fore and aft movement the slider member having a sealing face in sealed slidable engagement with the sealing face of the base member,
   c a nipple projecting forwards from the slider member,
   d milk passages extending through the base member and the nipple of the slider member, the passages having ports opening out of the sealing faces of both members, the ports being located so that when the milk hose is thrust onto the nipple the slider member is moved to a valve open position in which the ports register and when the hose is pulled off the nipple the slider member is moved to a valve closed position in which the ports are out of register and closed by the sealing faces,
   e spaced apart grooves in the sealing surface of the slider member and a resilient detent projecting outwards of the sealing face of the base member adapted to extend into the grooves for yieldably restraining movement of the slider member from the valve open and closed positions.

2. A valve as claimed in claim 1, including spaced apart stops extending from the slider member for limiting movement of the slider member relative to the base member between the valve open and valve closed positions.

3. A valve as claimed in claim 2 in which the stops are pins projecting from the slider member, one of the pins being removable so as to enable the slider member to be removed from the base member.

* * * * *